Aug. 29, 1967        C. M. ASHLEY        3,338,065
WATER PURIFYING APPARATUS AND METHOD
Filed Jan. 4, 1965        3 Sheets-Sheet 1
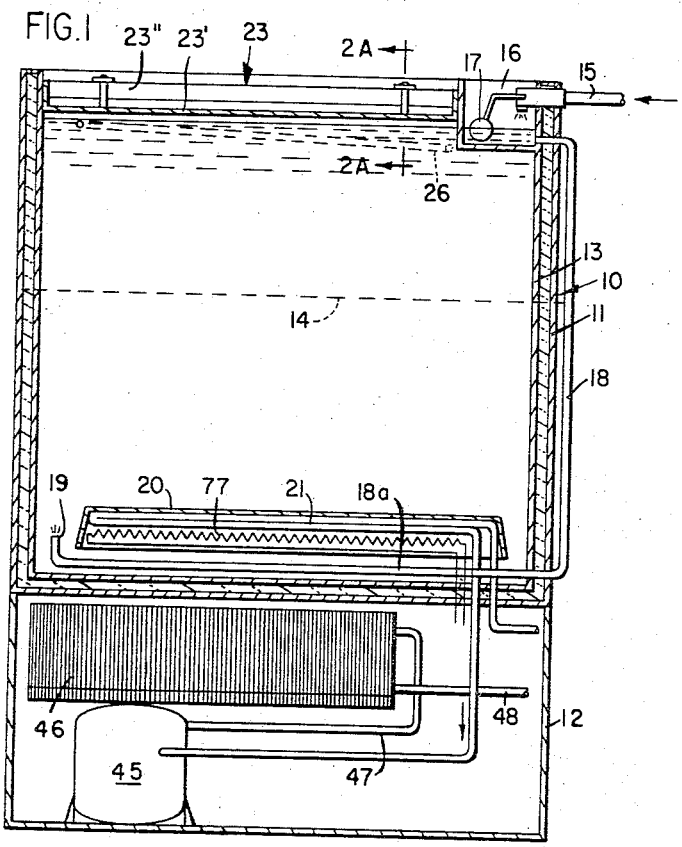
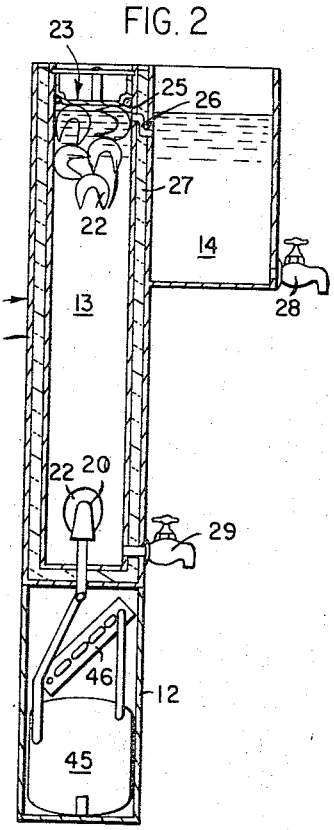
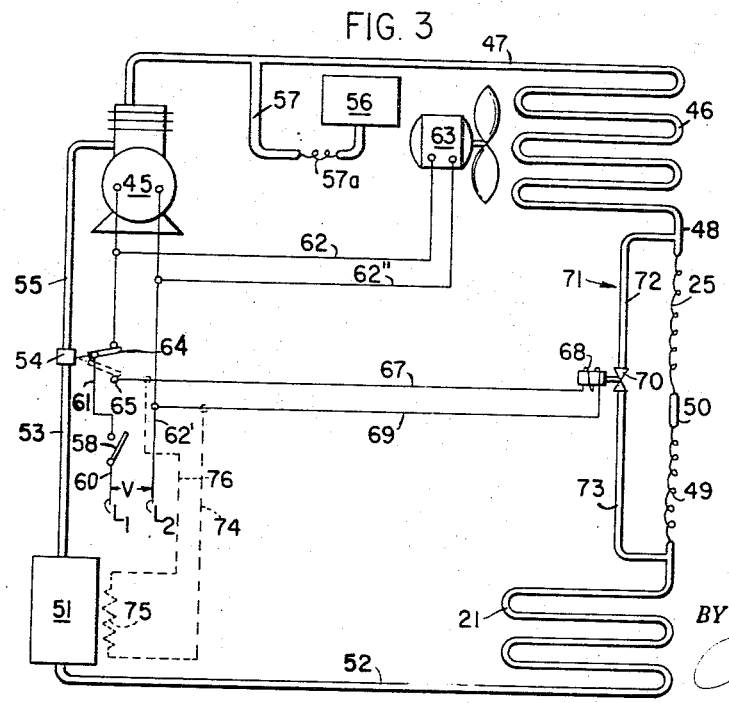
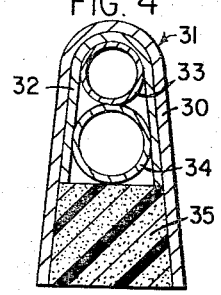
*INVENTOR.*
CARLYLE M. ASHLEY.
BY
*ATTORNEY.*

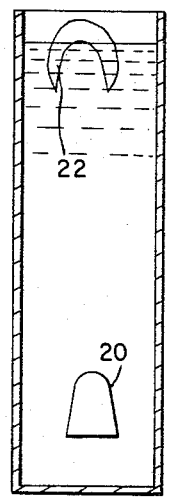
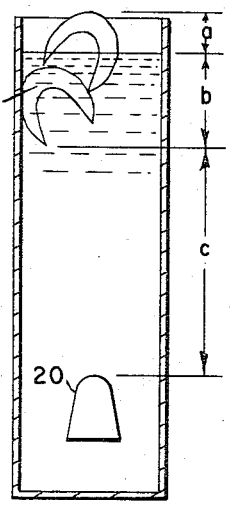
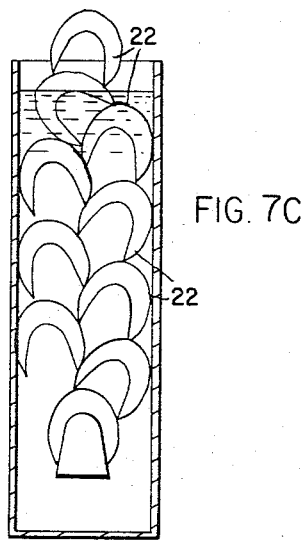
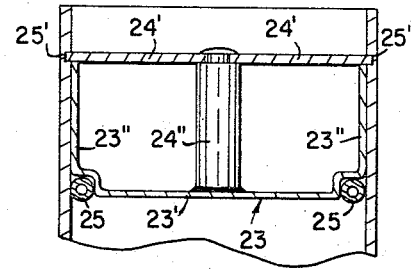

Aug. 29, 1967　　　　　　　C. M. ASHLEY　　　　　　　3,338,065
WATER PURIFYING APPARATUS AND METHOD
Filed Jan. 4, 1965　　　　　　　　　　　　　　　　　3 Sheets-Sheet 3

INVENTOR.
CARLYLE M. ASHLEY
BY　*Raymond Curtis*
ATTORNEY.

United States Patent Office 3,338,065
Patented Aug. 29, 1967

3,338,065
WATER PURIFYING APPARATUS
AND METHOD
Carlyle M. Ashley, Fayetteville, N.Y., assignor to Carrier
Corporation, Syracuse, N.Y., a corporation of Delaware
Filed Jan. 4, 1965, Ser. No. 423,054
17 Claims. (Cl. 62—123)

The present invention relates to a method and apparatus for converting impure water into purified water by a freezing process and to an improved refrigeration system therefor.

The term "purified water" as used herein means water from which all or a substantial proportion of impurities have been removed by flow through the apparatus or method forming the subject of the invention.

It is one object of the present invention to provide an improved method of converting impure water into purified water in an extremely simple manner and without the use of complicated controls or equipment.

Another object of the persent invention is to provide an improved water purifying system which can be combined with a conventional refrigerating system or a household refrigerator and thereby prvoide small quantities of purified water for household use.

A further object of the present invention is to provide an improved and simplified refrigeration system which is capable of providing defrosting action in an extremely simple and expedient manner and without use of complicated controls. Other objects and attendant advantages of the present invention will be readily perceived hereafter.

The improved method of converting impure water into purified water in accordance with the present invention consists of the steps of feeding impure water to a predetermined level in a tank, freezing a portion of said impure water into ice on a freezing surface at a lower portion of said tank, releasing said ice from said freezing surface and permitting it to rise toward the top of said tank and collect as a mass in the upper portion of said tank, melting a portion of said ice above the level of said water without agitating the water in said tank to thereby produce purified water at the top of said tank from said ice while permitting heavier impure water to remain in the lower portion of said tank, and causing a portion of said purified water formed by said melting at the upper portion of said tank to wash the ice at the upper portion of said tank as said ice rises through said purified water.

The apparatus for practicing the improved method includes a tank with a freezing surface in the lower portion thereof for freezing a portion of impure feed water into ice, defrost means for periodically releasing the ice to permit it to rise to the top of the tank, melting means at the top of the tank to form purified water from the ice, means for removing a portion of the purified water from a point near the top of the tank, means for removing the impure water from the bottom of the tank, and means for conveying feed water to the tank to replace the purified and impure water which was withdrawn.

The improved refrigeration system associated with the improved apparatus for purifying water consists of the conventional refrigeration system including a compressor, condenser, evaporator and refrigerant expansion means operatively interposed between the condenser and evaporator. In addition, a bypass is provided around the expansion means and an accumulator is associated with the condenser. When the bypass means are opened, the refrigerant pressure in the condenser is lowered and liquid refrigerant delivered from the accumulator will be evaporated in the condenser which will then function as an evaporator and the evaporated refrigerant after passing through the bypass means will be fed to the evaporator where it is condensed thereby providing heat to its surroundings to produce a defrosting action. The refrigerant is thereafter fed to a low side accumulator which retains the liquid refrigerant but permits gaseous refrigerant to return to the compressor. If desired, a heater may be associated with the accumulator on the low side to enhance vaporization of the refrigerant therein prior to feeding it to the compressor. All aspects of the present invention will be more fully understood when the following portions of the specification are read in conjunction with the accompanying drawings wherein:

FIGURE 1 is a side elevational view, partly cut away, of the improved water purifying apparatus of the present invention;

FIGURE 2 is an end elevational view, partly cut away, of the apparatus of FIGURE 1;

FIGURE 2A is a detail view of the manner in which the melter pan attaches to the melter capillary, this view being taken along line 2A—2A of FIGURE 1;

FIGURE 3 is a schematic diagram showing the refrigeration system employed in the apparatus of FIGURES 1 and 2;

FIGURE 4 is a cross sectional view of a freezing surface which may be used in the apparatus of FIGURES 1 and 2;

FIGURES 7A, 7B and 7C are schematic views illustrating the creation and collection of ice formations in the water purification system forming the subject of the invention;

Figure 5:
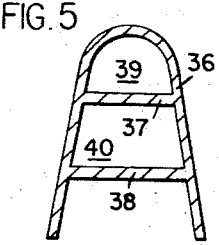
FIGURE 5 is a modified type of freezing surface.

The apparatus 10 for converting impure water into purified water includes a housing 11 having a lower section 12 for housing various components of the refrigeration system and an upper section which includes a purification tank 13 and a product storage chamber 14. Impure water is fed to the apparatus through conduit 15 and into float valve chamber 16. A float valve 17 controls the level of the liquid in chamber 16, this level being approximately the same as the level in tank 13 because they are in communication with each other. The input water thereafter passes through conduit 18 extending downwardly from float chamber 16, entering tank 13 near the bottom, passes inside tube section 18a horizontally across the bottom of tank 13 for a purpose to be described later, and issues from the end 19 of conduit 18a.

In accordance with one aspect of the present invention, a portion of the impure water which is fed to tank 13 is formed into ice on freezing surface 20 which is located in the lower portion of tank 13. Freezing surface 20 on which ice is formed encloses the evaporator coil 21. After a predetermined amount of ice is formed on surface 20 the refrigeration is terminated, and surface 20 is heated to release ice formation 22 (FIGURE 2), whereupon it will float upwardly in tank 13 and underlie the other ice formations in the top portion of the tank. It will be appreciated, of course, that the ice formations are finely divided physical bodies of frozen water free of impurities, between which clings liquid water containing impurities dissolved therein and removal of such purified water as ice from the impure water within tank 13 causes the remaining water to be more concentrated with impurities.

A melter pan or plate 23 is located in the upper portion of tank 13 above the level of the liquid therein. Pan 23 includes a bottom portion 23' and upstanding wall portions 23" extending coextensively with the top of tank 13 as shown in FIGURE 1. Secured to the pan at the junction between the walls and the base are melter pan capillaries 25 which form a part of the refrigeration circuit, note FIGURE 3, and which contain warm refrigerant. The pan 23, being formed of conductive material is in turn warmed by these capillaries. Rotatable arms 24' connected to spaced post 24" project, upon rotation, into grooves 25' formed in the walls 23" to secure the pan to the tank as seen in FIGURE 2A. As the ice mass in the tank increases in depth, the buoyancy of the ice causes the top of the ice to project above the liquid level until it touches the bottom of the melting surface 23, thereby withdrawing heat from 23 and melting the ice in contact with it.

An important feature of the invention involves the distance between the level of water in the tank and the ice melter means. If the ice were continuously formed and released without any melting means involved, the ice formation would build up in the manner shown schematically in FIGURES 7A, 7B and 7C. As illustrated in FIGURE 7A, the first block of ice would, upon release in the manner described, float to the upper surface of the body of liquid in the tank and have a portion thereof submerged and a smaller portion projecting above the level of the liquid. FIGURE 7B shows the relative position of the ice blocks when a second is formed and released, and FIGURE 7C shows the tank relatively full of ice blocks at least to the point where the continuous ice formation-ice harvest cycle is disrupted through the inability to effect complete ice block release. There is a fixed relationship between the height $a$ of the ice projecting above the surface of the liquid and the distance $b$ that the ice bed projects into the liquid in the tank. Distance $c$ between the lowermost point of the ice bed and the top of the freezer element is the depth of liquid in the tank above the freezer minus distance $b$. The maintenance of a proper ice bed depth $b$ is important since if it is too deep, it will interfere with release of the ice formations from the freezing surface, and if it is too shallow, the residence time of the ice in the column will be inadequate to obtain proper ice washing as will hereinafter be described. It should be noted that the rate of ice melting is determined solely by the rate of freezing and over a long time period they must be equal.

This invention contemplates controlling the depth of the ice bed $b$, by controlling the liquid level in the tank and thus controlling distance $a$. By manipulating float control mechanism 17, the liquid level can be varied relative to the melting pan height. The distance $b$ will change inversely with a change in liquid level.

Since ice 22 is free of soluble impurities, when it melts, the water formed from the melting ice will be pure water. This water is at an elevation slightly above the surface of the water in the tank. Thus it is able to flow downwardly and sideways through the ice mass to the surrounding liquid water area. In the process, it carries out of the porous ice the water which had been carried up through the tank along with the ice, thereby effectively washing the dissolved solids (impurities) out of the ice.

Since the ice is relatively impervious and since the head above the level of the water in the tank is very small, effective washing can only be accomplished if the ice moves up through the column very slowly.

As pointed out above, the newly frozen ice near the lower end of the ice mass has trapped water between the ice particles which contains concentrated impurities, said water being therefore denser than the liquid surrounding the ice particles and which results in a lower melting temperature for the ice, or stated another way, a lower freezing temperature for the trapped liquid as compared to the freezing temperature of the liquid surrounding the ice particles. In this region, there are powerful forces due to the density and temperature differences which tend to remove the concentrated solution from the ice and replace it with less concentrated solution. The forces are best understood by reference to the mode of growth of the ice particle as it constantly rejects heat to the trapped water and absorbs heat from the surrounding water. The flow of heat in this instance occurs with only minor temperature gradients. However, even in the lower part of the ice mass the action is relatively slow and considerable time must be allowed for the separation to occur. As the concentration of impurities decreases when the ice rises through the tank, so do the magnitude of the separating forces due to density and temperature differences described above decrease. Near the top of the ice mass, these are replaced with the washing action described above.

At this juncture, it is to be noted that the purity of the resulting purified water depends in part on the length of time that the ice remains at the top portion of tank 13 prior to melting, a point referred to above. It should remain at the top at least three hours and preferably for between four and five hours so that a relatively pure product is obtained. However, this figure may vary depending on the purity of the incoming feed water. The amount of ice in tank 13 may therefore be varied by adjusting the level of the water in the tank in the manner described above. More specifically, it will be appreciated that ice has a certain buoyancy since it is less dense than water so that a small portion of its volume will be above the surface of the liquid in tank 13. This being the case, by varying the liquid level, as heretofore indicated, proportionately greater or less amount of ice may be retained below the liquid level. The more elevated the liquid level is, the less ice will be retained within tank 13 prior to melting and therefore the shorter will be the residence time to provide a less pure product. Conversely, the farther the liquid level is from the bottom of pan 23, the greater will be the residence time of the ice and therefore the purer will be the resulting product.

It will also be appreciated that the capacity of the refrigeration system must be adjusted so that it does not form the ice either too quickly or too slowly. If it forms the ice too quickly the ice will move up through the tank too rapidly and may not be fully washed. Also there may be too great an amount of pure water in tank 13 when such amount is not needed by the user's requirements and therefore there will be a waste of refrigerating capacity. On the other hand, if the refrigerating capacity is too low so that insufficient ice is formed, there will not be sufficient purified water to satisfy the user's needs.

It is to be noted from FIGURES 1 and 2 that a restricted passage 26 is located in wall 27 separating tank 13 and product storage tank 14. This passage will permit liquid to drain from tank 13 into tank 14 at a predetermined rate which will not exceed the capacity of the system to produce purified water and will not cause any agitation within tank 13. It will be appreciated that whenever the level in tanks 13 and 14 are equal there will be no passage of purified water from the former into the latter. However, when the level in tank 13 exceeds the level in tank 14, the flow will be at a relatively slow rate as determined by the dimension of the restrictor 26, to provide the design capacity of product water. When pure water is withdrawn, more pure water is fed to reservoir 14 to restore its level but without at any time exceeding the capacity of the purifier. When the levels in the two tanks are equal, there will be a continued build-up of purified water within tank 13 and such build-up will continue so that purified water will be available for transfer to tank 14 through restriction 26 when the level in tank 14 is depleted.

It will be appreciated of course, that as purified water is removed from tank 13 the impure water will increase in concentration therein and in the interest of efficient operation such impure water must be removed. This removal may be effected through faucet 29 which may be periodically actuated manually or, if desired, a suitable automatic timing device not shown may be utilized to periodically open faucet 29 for a predetermined time interval in order to drain the concentrated impure solution therefrom.

At this point it is to be noted that whenever the level in product tank 14 is depleted, the level in tank 13 will tend to be lowered and the level in float tank 16 will also go down to thus permit float 17 to open and permit flow of impure feed water to tank 13 through conduit 18. When the levels in tanks 13 and 16 again reach a predetermined height, float 17 will close to terminate the flow of impure water. For proper operation of the system, there must be a higher ice production rate than purified water removal.

Figure 6:
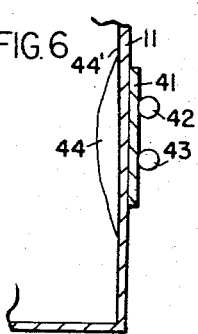
FIGURE 6 is a still further modified type of freezing arrangement.

Suitable configurations for providing a refrigerating effect to the freezing surface 20 are shown in FIGURES 4, 5 and 6. As noted from FIGURES 2, 4 and 5, one general class of freezing surfaces is relatively narrow at the top and flares downwardly to provide a sufficient draft so that when the surface of ice formation 22 in contact with freezing surface 21 is melted, it will immediately leave the freezing surface and float upwardly. Furthermore, there should be no overhangs or any other type of projections which would impede the foregoing releasing process. The outer layer 30 of freezer 31 (FIGURE 4) is preferably made of stainless steel, cupronickel or other metal of low thermal conductivity. Located internally of outer member 30 is an inner member 32 of copper which in turn houses refrigerating coils 33 and 34. The bottom is sealed by polyurethane foam 35, or the like. As can be seen from FIGURE 4, the outer low thermal conductivity layer of the cupronickel or stainless steel extends downwardly beyond the lowermost portions of the copper layer 32 to provide less refrigerating effect at the lower portions and thus prevent the ice formation from extending under the lowermost portions of the freezing surface. In addition, the relatively warm feed water flowing through the horizontal section 18a of feed conduit 18, provides some heat to limit the downward growth of the ice on freezer 31. This also serves to precool the incoming feed water.

In FIGURE 5 a further embodiment of a form of freezing surface is shown. The outer surface of freezing member 36 may be of the same configuration as that shown in FIGURE 4 and the outer shell of member 36 may be made of cupronickel or stainless steel. However, the embodiment of FIGURE 5 differs from that of FIGURE 4 in that partitions 37 and 38 are provided for providing chambers 39 and 40 in conjunction with outer shell 36, chamber 39 forming an inlet conduit for the refrigerant and chamber 40 forming an outlet conduit for the refrigerant. It is to be noted that the conduits terminate short of the bottom of outer shell 36 so that less refrigerating effect will be obtained at the bottom to thereby tend to obviate the possibility that the ice forming on the freezing surface will hook under the bottom and thus hinder the release of the ice formation.

In FIGURE 6 a still further freezing arrangement is shown wherein a copper plate 41 is mounted on the outside of tank 11 in which the freezing of the ice is effected. Refrigerant coils 42 and 43 are mounted on the outside of plate 41 and the ice formation 44 is formed on the inside wall 44′ of tank 11.

A refrigerating circuit which may be used in the apparatus of FIGURES 1 and 2 is shown in FIGURE 3 with numerals common to all three figures depicting like parts. The refrigerating circuit includes a compressor 45 coupled to condenser 46, which may be a gravity condenser, by means of conduit 47. The outlet of condenser 46 in turn is coupled to melter pan capillary 25 by conduit 48. At this point it is to be noted from FIGURE 2 that the melter pan capillary 25 supports melter pan 23 and the heat of the refrigerant in capillary 25 provides the heat for melting the ice formation as described in detail above. The melter capillary 25 in turn is coupled to expansion capillary 49 by conduit 50 and the refrigerant which is expanded therein is conducted to evaporator 21 which is located within freezing surface 20 (FIGURE 1). In turn, the outlet of evaporator 21 is fed to low side accumulator 51 by conduit 52, it being appreciated that the feed to accumulator 51 is at the bottom and the outlet is at the top in order to avoid drawing refrigerant into conduit 53 which in turn is in communication with the low side of compressor 45 through conduit 55.

During the functioning of the above described refrigerating circuit, freezer surface 20 will be cooled sufficiently to freeze ice formations in the above described manner. Furthermore, at this time, a high side accumulator 56 which is in communication with conduit 47 through conduit 57 will store refrigerant therein inasmuch as there is an excess of refrigerant in the system because of the requirements during defrosting. The refrigerant stored in high side accumulator 56 will be in liquid form because heat is transferred from the warm refrigerant to the surrounding air through the walls of the accumulator.

It will be appreciated that when the refrigerating system is placed in operation by the closing of switch 58 a circuit will be completed from electrical supply through lead 60, switch 58, lead 61, normally closed contacts on switch 54, compressor 45, and return lead 62′. A similar circuit is made through fan 63 via leads 62 and 62″. The above described refrigerant path will be maintained until pressure switch 54 senses that the pressure of the refrigerant leaving accumulator 51 corresponds to a predetermined low temperature indicating that it is time for defrost, because a sufficient amount of ice has formed on freezing surface 21, and at such time the movable contact 64 of switch 54 shifts to contact 65 to thereby complete a circuit from the electrical supply through lead 61, switch contacts 64 and 65, lead 67, solenoid coil 68 the lead 69 to complete the circuit. The energization of solenoid coil 68 will cause valve 70 to open, said valve being in bypass 71 having one leg 72 in communication with conduit 48 and another leg 73 in communication with evaporator 21.

Immediately upon the opening of valve 70, refrigerant will flow through bypass 71 rather than through the melting capillary 25 and expansion capillary 49. At this time, there will be a release of liquid refrigerant from high side accumulator 56 because of the lowering of the high side pressure due to equalizing high and low side pressure and this liquid refrigerant will flow into condenser 46 through conduit 47. However, since the refrigerant is colder than the ambient air, it will change its state in condenser 46 from a liquid to a gas and thus cause condenser 46 to act as an evaporator during defrost. The refrigerant flow rate from accumulator 56 is limited by a restrictor 57a in the line 57 so that there is adequate capacity in the condenser 46 to permit complete vaporization of the liquid. Refrigerant, in gaseous form, will then flow through conduit 48 and bypass 71 to evaporator coil 21. However, the gaseous refrigerant in evaporator coil 21 being chilled by the existence of ice on the surface of freezing surface 20 will condense and in so doing give off its latent heat of vaporization thereby providing heat to the ice formation on surface 20. The liquid refrigerant leaving evaporator 21 will flow through conduit 52 to low side accumulator 51. It will be appreciated that it is undesirable to pass liquid refrigerant to compressor 45 and therefore the low side accumulator 51 as previously described will permit only gaseous refrigerant to leave through the top via conduit 53 and thereby prevent slugging in compressor 45.

If desired, an alternate form of electric circuit may be used as shown in dotted lines in FIGURE 3 wherein a lead 74 adds resistance heater 75 to the remainder of the electrical components. Heater 75 is coupled to lead 69 by lead 74 and is also coupled to the supply by lead 76. This heater, as is apparent from the circuit diagram, will be energized only when valve 70 is opened during the defrost cycle and the heat generated by heater 75 will aid in vaporizing the liquid refrigerant in low side accumulator 51 to insure the existence of gaseous refrigerant for passage to compressor 45.

Figure 7:
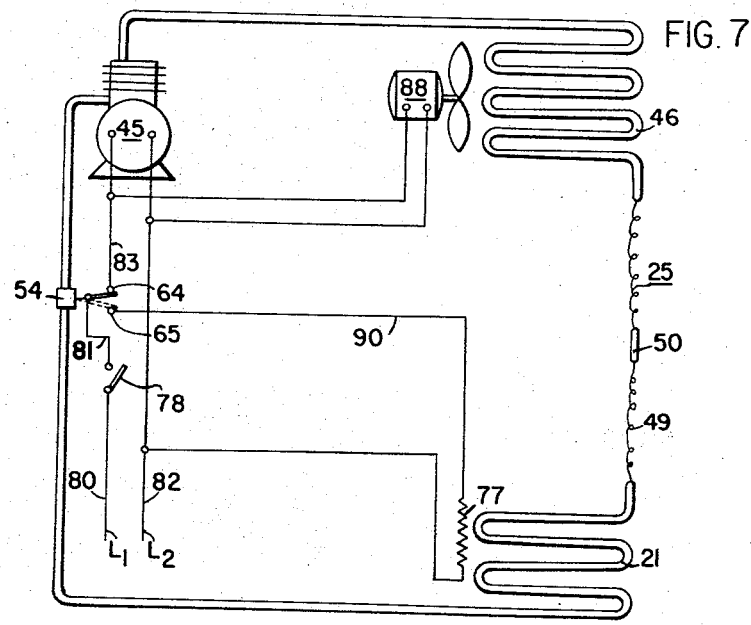
FIGURE 7 is a schematic diagram of an alternate defrost arrangement for the refrigeration circuit.

It will be appreciated that during the above described defrost cycles, whether the defrost be effected by refrigerant alone or by the use of a resistance heater such as 75 in conjunction with the refrigerant, the compressor will operate during the defrost. However, if desired, an alternate type of defrost system may be provided, this being shown in part in FIGURE 1 wherein an electric resistance heater 77 is solely utlized for defrost. An electric circuit of this type is shown in FIGURE 7 in conjunction with the refrigerating circuit shown therein which may be identical to the refrigerating circuit shown in FIGURE 3 except that the low side and high side accumulators have been omitted inasmuch as they are not needed. It is believed that the description of the refrigerating circuit is unnecessary. However, in the electric circuit it is to be noted that the closing of the starting switch 78 will cause completion of a circuit from line L₁, of the power supply through lead 80, switch 78, lead 81, switch 54, lead 83, compressor 45, lead 82 to the other side of the power supply. Connected in parallel across leads 82 and 83 is condenser fan motor 88. The foregoing circuit will be maintained all the while that freezing is being effected by evaporator 21. However, when the pressure switch 54 senses a low pressure corresponding to a temperature in evaporator 21 which indicates that there has been a sufficient ice formation, contacts 65 and 64 of switch 54 will close to thereby complete a circuit from one side of the power supply contacts 64 and 65, lead 90, resistance heater 77 to the other side of the power supply. It will be appreciated that through the foregoing circuit resistance heater 77 will be energized to thereby provide defrosting heat to freezing surface 20 for release of ice formation 22.

Figure 8:
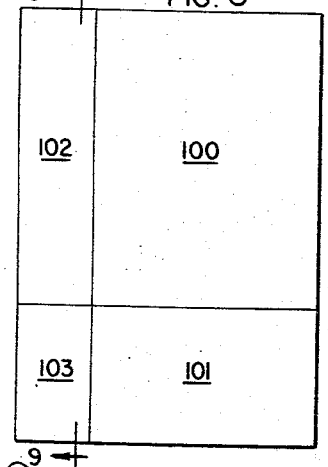
FIGURE 8 is a schematic view of a combined household refrigerator and water purifier.
Figure 9:
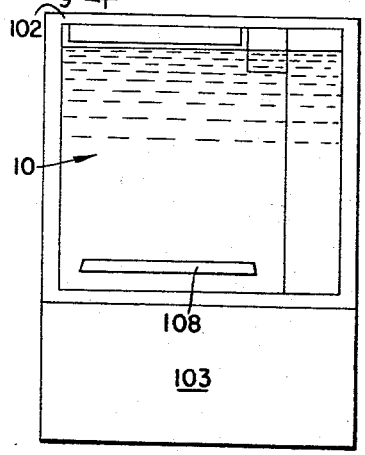
FIGURE 9 is a view taken substantially along line 9—9 of FIGURE 8 for showing how the water purifier is oriented in the combined device of FIGURE 8.

In FIGURE 8 a schematic diagram of a combined refrigerator and water purifier is shown which essentially includes a freezer section 101, a water purifier section 102, a refrigerator section 100, and a compressor compartment 103. In FIGURE 9 the relationship between the water purifier section 102 and compressor compartment 103 is shown, FIGURE 9 being a view taken substantially along line 9—9 of FIGURE 8. The water purifier shown in FIGURE 9 may be in all respects identical to water purifier 10 described in detail above in FIGURES 1 and 2. Therefore a detailed explanation will not be made. It will be appreciated that the suitable conduits and water circuits have been omitted from FIGURES 8 and 9 in the interest of clarity. Furthermore, it will be appreciated that the combined refrigerator and water purifier possesses the necessary insulated walls for defining the various compartments, these walls being shown as unnumbered straight lines in FIGURES 8 and 9.

Figure 10:
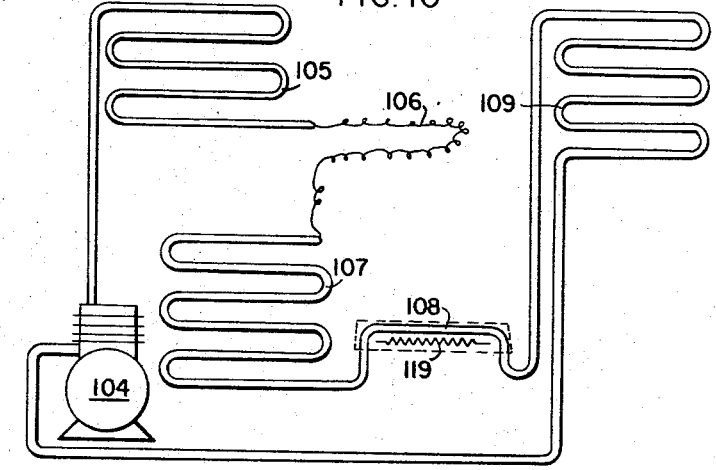
FIGURE 10 is a schematic drawing of a refrigeration circuit for the combined unit of FIGURES 8 and 9.

A suitable refrigeration circuit for the combined refrigerator and water purifier is shown in FIGURE 10 and includes a compressor 104, a gravity condenser 105, a melting capillary 106 (which is analogous to capillary 25 of FIGURE 2), a freezer evaporator 107, an ice maker evaporator 108 and an air space evaporator 109 which are all coupled to each other in series in the above mentioned order by suitable conduits (not numbered), the air space evaporator 109 for the refrigerator being the last of the series and having its outlet coupled to the inlet of compressor 104.

Figure 11:
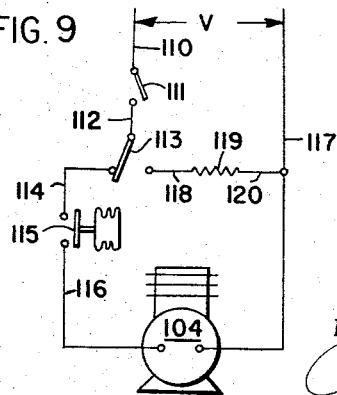
FIGURE 11 is a schematic electrical wiring diagram for the refrigeration circuit of FIGURE 10.

An electrical circuit for FIGURE 10 is shown in FIGURE 11 with the parts of the circuit of FIGURE 11 being in the position which they occupy during the freezing cycle. During normal operation a circuit is completed from the voltage source V through lead 110, main power switch 111, lead 112, two-pole thermostatic switch 113 which is attached to the low conductivity element of the freezing surface of evaporator 108, lead 114, thermostatic switch 115 located in the refrigerator compartment, lead 116, refrigerant compressor motor 104 and through lead 117 back to the other side of the voltage source V.

Thermostatic switch 113 is of the snap acting type with the switch over temperature slightly above the freezing temperature to connect with lead 114 and slightly below freezing to connect with lead 118. The thermal element is located so that as the thickness of ice builds up on the freezing surface of evaporator 108, the desired ice thickness will be reached when the thermostat reaches the temperature at which it switches the circuit from lead 114 to lead 118. From lead 118 the circuit continues through heater 119 which is adjacent evaporator 108 and which supplies the necessary heat to defrost evaporator 108. At the same time, the switch 113 breaks the circuit to the motor of compressor 104. When the freezing surface of evaporator 108 has been defrosted, the thermal element of switch 113 will rise in temperature to above freezing and the switch will once more be returned to contact with lead 114 so that the normal refrigeration cycle can be carried on responsive to refrigerator temperature control 115 located in the refrigerator compartment.

Preferably, the freezing and melting eelments of water purifier 102 are in good thermal contact with the refrigerator compartment so that the melting of the ice will remove at least a portion of the heat entering the refrigerator and so that defrosting may at times be accomplished by means of the heat in the refrigerator compartment.

While preferred embodiments of the present invention have been disclosed, it will be appreciated that the invention is not limited thereto but may be otherwise embodied within the scope of the following claims.

I claim:

1. A refrigeration system comprising a compressor, a condenser coupled to said compressor, an evaporator, expansion means coupling said condenser and said evaporator, conduit means coupling said evaporator to said compressor, bypass means selectively actuatable to an open position for conducting refrigerant around said expansion means to thereby place said condenser in direct communication with said evaporator, an accumulator operatively associated with said condenser for providing liquid refrigerant to said condenser when said bypass means are in said open position to thereby cause said condenser to function as an evaporator and cause said evaporator to receive gaseous refrigerant from said condenser and condense said refrigerant therein to thereby function as a condenser and thereby provide heat for defrost of said evaporator and restricted passage means connecting the accumulator with said condenser and through which the said liquid refrigerant is supplied to the condenser.

2. A refrigeration system as set forth in claim 1 including a second accumulator associated with said evaporator for storing condensed liquid refrigerant therein and permitting only gaseous refrigerant to flow to said compressor.

3. A refrigerating system as set forth in claim 2 including heating means associated with said second accumulator for aiding in the evaporation of liquid refrigerant therein.

4. A refrigeration system as set forth in claim 3 including control means for selectively actuating said bypass means to said open position in response to predetermined temperature conditions at said evaporator and for simultaneously energizing said heating means.

5. A method of converting impure water into purified water comprising the steps of feeding impure water to a predetermined level in a tank, freezing a portion of said impure water into ice on a freezing surface at a lower portion of said tank, releasing said ice from said freezing surface and permitting it to rise toward the top of said tank, controlling the rise of the ice to a predetermined amount above the level of said water to thereby regulate the amount of ice in said tank, melting a portion of said ice above the level of said water without agitating the impure water in said tank to thereby produce purified water at the upper portion of said tank to permit heavier impure water to remain in the lower portion of said tank and causing a portion of said purified water formed by said melting to wash the ice at the upper portion of said tank as said ice rises through said purified water.

6. A method as set forth in claim 5 including the steps of withdrawing concentrated impure water from the lower portion of said tank and withdrawing purified water from the upper portion of said tank.

7. A combined refrigerator and water purifier comprising a refrigerator compartment, a water purifier compartment, cooling means operatively associated with said refrigerator compartment, freezing means operatively associated with said water purifier compartment, a water tank in said water purifier compartment for receiving impure water, said freezing means being located proximate the bottom of said water tank, means operatively associated with said water purifier tank for selectively removing purified water therefrom, means operatively associated with said tank for admitting impure water thereto, control means for selectively effecting defrost of said freezing means to release ice therefrom and permit said ice to float to the top of said tank, and melting means for melting said ice into purified water at the top of said tank.

8. A water purifier and refrigerator as set forth in claim 7 including temperature sensing means operatively associated with said refrigerator compartment and temperature sensing means operatively associated with said freezing means for causing defrosting of said freezing means when either of said temperature sensing means register a sufficiently low temperature.

9. A method for converting impure water into purified water comprising the steps of feeding impure water to a predetermined level in a tank, freezing a portion of said impure water into ice on a freezing surface at a lower portion of said tank, releasing said ice from said freezing surface and permitting it to rise toward the top of said tank without agitating the impure water in said tank, causing the ice at the top of the tank to melt to produce purified water at the top of said tank while permitting heavier impure water to remain in the lower portion of said tank as a result of not producing agitation between said ice and said impure water, said purified water at the top of said tank acting to wash said ice rising to the top of said tank, and selectively removing purified water from the top of said tank and impure water from the bottom of said tank.

10. Apparatus for converting impure water into purified water comprising a tank, means for conducting impure water to the lower portion of said tank, freezing means located in the lower portion of said tank, melting means located in the upper portion of said tank, means for selectively releasing ice formed on said freezing means to cause said ice to move upwardly toward the top of said tank and be melted into purified water by said melting means, means for withdrawing purified water from the upper portion of said tank, means for withdrawing concentrated impure water from the lower portion of said tank, said freezing means comprising an evaporator of a refrigeration system and said melting means comprising both a capillary for receiving heated refrigerant and conducting means for conducting the heat of said heated refrigerant to the ice at the top of said tank, and means for selectively adjusting the level of ice in the upper portion of said tank to thereby vary the capacity of said apparatus.

11. Apparatus for converting impure water into purified water comprising a tank, means for conducting impure water into said tank; a refrigeration system for freezing impure water at the bottom of said tank into purified ice and melting said purified ice at the top of said tank to form purified water, said refrigeration system comprising a compressor, a condenser coupled to said compressor, an evaporator, expansion means coupling said condenser and said evaporator, bypass means for selectively conducting refrigerant around said expansion means to thereby place said condenser in direct communication with said evaporator to thereby cause said condenser to function as an evaporator and to cause said evaporator to function as a condenser to thereby provide heat for defrost of said evaporator, said evaporator being located at the bottom of said tank for freezing said water into purified ice, melting means located proximate the top of said tank and including conduit means for conducting hot gases from said compressor; means for selectively releasing ice from said evaporator to permit it to flow to the top of said tank; means for selectively withdrawing impure water from the bottom of said tank; and means for selectively withdrawing purified water formed as a result of melting said purified ice by said melting means from the top of said tank.

12. A water purifying apparatus as set forth in claim 11 wherein an accumulator is operatively associated with said condenser for providing liquid refrigerant to said condenser when said bypass means are in an open position to thereby cause said condenser to function as said evaporator.

13. A water purifying system as set forth in claim 12 including a second accumulator operatively associated with said evaporator for storing condensed refrigerant therein when said evaporator functions as a condenser to permit only gaseous refrigerant to flow to said compressor from said evaporator.

14. The method of obtaining purified water from impure water comprising the steps of supplying impure water to a predetermined level in a tank having a refrigerated surface disposed therein, alternately forming a portion of the impure water into ice on the refrigerated surface and releasing the ice formation from the surface so it will be free to rise to the surface of the liquid in the tank and assume a given relationship of ice submerged in the body of liquid in the tank and ice projecting above the level o fliquid in the tank, arranging a source of heat above the top of the tank in the path of the movement of ice above the liquid level in the tank so that the upper part of the ice will melt and drain downwardly through the ice disposed therebeneath, adjusting the relative distance between the heat source and the level of liquid in the tank to assure the formation of a layer of purified water at a predetermined distance from the top of the liquid level in the tank commensurate with a predetermined purified water withdrawal rate.

15. Apparatus for converting impure water into purified water comprising a tank, means for conducting impure water to the lower portion of said tank, freezing means located in the lower portion of said tank, melting means located in the upper portion of said tank, means for selectively releasing ice formed on said freezing means to cause said ice to move upwardly toward the top of said tank and be melted into purified water by said melting means, means for withdrawing purified water from the upper portion of said tank, means for withdrawing concentrated impure water from the lower portion of said tank, said freezing mean comprising an evaporator of a refrigeration system and said melting means comprising both a capillary for receiving heated refrigerant and conducting means for conducting the heat of said heated refrigerant to the ice at the top o fsaid tank, and means for selectively adjusting the level of ice in the upper portion of said tank to thereby vary the capacity of said apparatus, said means for adjusting the level of ice in the upper portion of said tank comprises an arrangement for varying the distance between said conducting means and the level of water in said tank.

16. Apparatus for converting impure water into purified water comprising a tank, means for conducting impure water into said tank; a refrigeration system for freezing impure water at the bottom of said tank into purified ice and melting said purified ice at the top of said tank to form purified water, said refrigeration system comprising a compressor, a condenser coupled to said compressor, an evaporator, expansion means coupling said condenser and said evaporator, and conduit means coupling said evaporator to said compressor, bypass means for selectively conducting refrigerant around said expansion means to thereby place said condenser in direct communication with said evaporator to thereby cause condenser to function as an evaporator and to cause said evaporator to function as a condenser to thereby provide heat for defrost of said evaporator, an accumulator associated with said condenser for providing liquid refrigerant to said condenser when said bypass means are in an open position to thereby cause said condenser to function as said evaporator, a second accumulator operatively associated with said evaporator for storing condensed refrigerant therein when said evaporator functions as a condenser to permit only gaseous refrigerant to flow to said compressor from said evaporator, said evaporator being located at the bottom o fsaid tank for freezing said water into purified ice, melting means located proximate the top of said tank and including conduit means for conducting hot gases from said compressor, said melting means including a melter pan and wherein the distance between the melter pan and the surface of the water is adjustable to thereby vary the amount of ice accumulation in said tank and thereby vary the water purifying capacity of said apparatus; means for selectively releasing ice from said evaporator to permit it to flow to the top of said tank; means for selectively withdrawing impure water from the bottom of said tank; and means for selectively withdrawing purified water formed as a result of melting said purified ice by said melting means from the top of said tank.

17. Apparatus for converting impure water into purified water comprising a tank, means for conducting impure water to said tank, freezing means located in the lower portion of said tank, melting means located in the upper portion of said tank, means for selectively releasing ice formed on said freezing means to cause said ice to move upwardly toward the top of said tank and be melted into purified water by said melting means, means for withdrawing purified water from the upper portion of said tank, said means including a capillary located below the water level in said tank, and means for withdrawing concentrated impure water from the lower portion of said tank.

References Cited
UNITED STATES PATENTS

| | | | |
|---|---|---|---|
| 2,340,721 | 2/1944 | Whitney | 62—58 |
| 2,419,881 | 4/1947 | Borgerd et al. | 62—124 |
| 2,713,249 | 7/1955 | Schordine | 62—155 |
| 2,942,432 | 6/1960 | Muffly | 62—352 X |
| 3,070,969 | 1/1963 | Ashley et al. | 62—124 X |
| 3,159,474 | 12/1964 | Moloney | 62—123 X |
| 3,163,020 | 12/1964 | Ross | 62—354 |

FOREIGN PATENTS 407,615   11/1944   Italy.

OTHER REFERENCES

Chemical and Engineering News, vol. 39, No. 31, July 31, 1961, pp. 46 and 47.

ROBERT A. O'LEARY, *Primary Examiner.*

MEYER PERLIN, *Examiner.*

W. E. WAYNER, *Assistant Examiner.*